United States Patent [19]

Long, Jr.

[11] Patent Number: 4,668,125
[45] Date of Patent: May 26, 1987

[54] SELF-CONTAINED, TRANSPORTABLE APPARATUS FOR INSERTING A LINER INTO A PIPE

[75] Inventor: Charles A. Long, Jr., Birmingham, Ala.

[73] Assignee: Long Technologies, Inc., Birmingham, Ala.

[21] Appl. No.: 759,540

[22] Filed: Jul. 26, 1985

[51] Int. Cl.$^4$ .................. E03F 3/06; E21D 11/00; F16L 9/14

[52] U.S. Cl. .................. 405/154; 405/150; 138/141; 156/294

[58] Field of Search .................. 405/150, 154–156, 405/174, 176, 177, 180, 179, 181, 183; 198/581, 592, 631, 632; 414/523, 526, 527, 528, 156; 156/294, 295; 138/97, 124, 140, 141

[56] References Cited

U.S. PATENT DOCUMENTS

| | | |
|---|---|---|
| 516,857 | 3/1894 | Bailey .................. 414/528 |
| 2,944,298 | 7/1958 | Bernhardt et al. . |
| 3,163,181 | 12/1964 | Xenis et al. . |
| 3,193,901 | 7/1965 | Lee et al. . |
| 3,204,788 | 9/1965 | Kleinsorge .................. 414/523 |
| 3,209,932 | 10/1965 | Schiltz .................. 414/528 X |
| 3,230,129 | 1/1966 | Kelly . |
| 3,287,148 | 11/1966 | Hillbush, Jr. . |
| 3,631,933 | 1/1972 | Bryant .................. 405/156 X |
| 3,662,045 | 5/1972 | Tierling . |
| 3,856,905 | 12/1974 | Dawson . |
| 3,927,164 | 12/1975 | Shimabukuro . |
| 4,009,063 | 2/1977 | Wood . |
| 4,064,211 | 12/1977 | Wood . |
| 4,135,958 | 1/1979 | Wood . |
| 4,182,262 | 1/1980 | Everson et al. . |
| 4,207,130 | 6/1980 | Barber . |
| 4,231,419 | 11/1980 | Gugel . |
| 4,237,937 | 12/1980 | Healy, Sr. . |
| 4,243,699 | 1/1981 | Gibson . |
| 4,273,605 | 6/1981 | Ross . |
| 4,350,548 | 9/1982 | Zenbayoshi et al. .......... 405/150 X |
| 4,366,012 | 12/1982 | Wood . |
| 4,385,885 | 5/1983 | Wood . |
| 4,390,574 | 6/1983 | Wood . |
| 4,401,696 | 8/1983 | Wood . |
| 4,434,115 | 2/1984 | Chick . |
| 4,439,469 | 3/1984 | Wood . |
| 4,442,891 | 4/1984 | Wood . |
| 4,446,181 | 5/1984 | Wood . |

FOREIGN PATENT DOCUMENTS

| | | | |
|---|---|---|---|
| 2232211 | 12/1974 | France .................. | 405/179 |
| 2313619 | 12/1976 | France .................. | 405/180 |
| 562564 | 7/1944 | United Kingdom .................. | 405/180 |
| 1589074 | 5/1981 | United Kingdom .................. | 405/174 |
| 170387 | 4/1965 | U.S.S.R. .................. | 414/528 |

Primary Examiner—Cornelius J. Husar
Assistant Examiner—Nancy J. Stodola
Attorney, Agent, or Firm—Panitch, Schwarze, Jacobs & Nadel

[57] ABSTRACT

A self-contained, transportable apparatus for inserting a flexible liner having a leading end and a trailing end into a pipe comprises an inversion means or insertion conduit, and means for sealingly clamping the leading end of the liner with a fluid tight seal to the insertion conduit or inversion means. A conveyer means having an entry end and an exit end is provided for conveying the liner to the insertion conduit or inversion means. In one embodiment, the conveyer means is comprised of a single conveyer which is movable between a generally horizontally oriented transport position and a generally sloped operating position. Another embodiment of the invention comprises two separate conveyers aligned in end-to-end relation, the two conveyers being movable between a transport position in which both conveyers are generally horizontally oriented, and an operating position in which the distal ends of the conveyers are higher than the remainder of the conveyers. Feed control means are provided for controlling the rate of movement of the liner into the pipe and means are provided for moving the conveyers between the transport position and the operating position.

23 Claims, 10 Drawing Figures

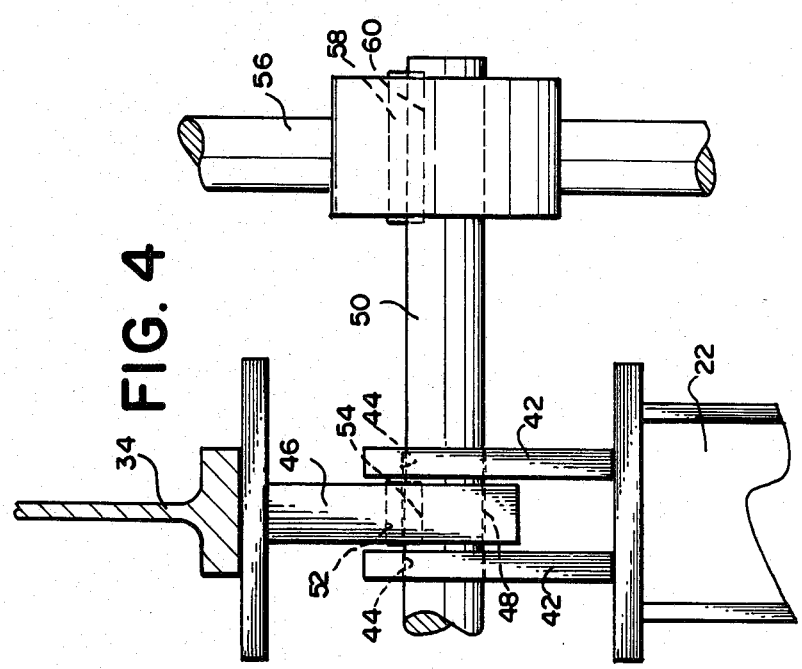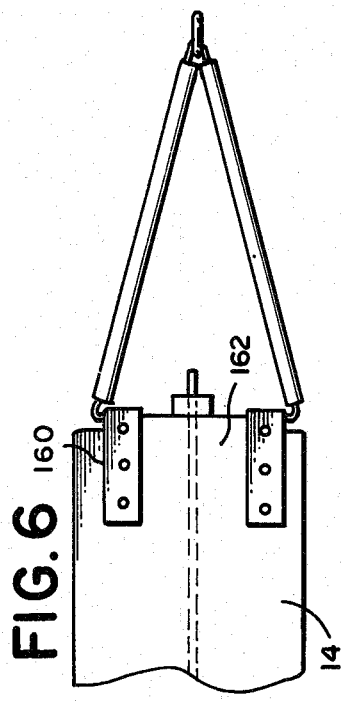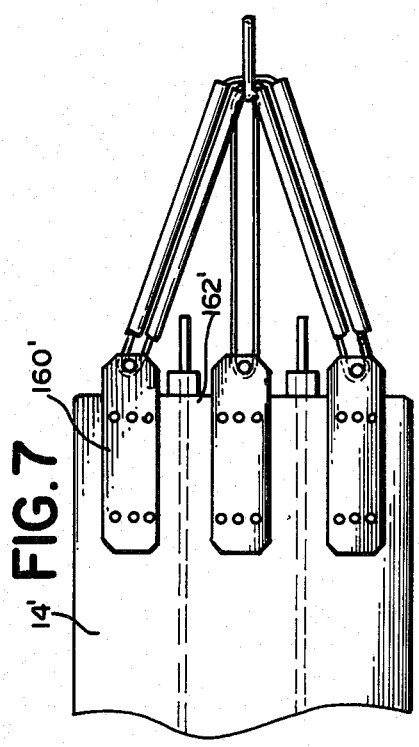

SELF-CONTAINED, TRANSPORTABLE APPARATUS FOR INSERTING A LINER INTO A PIPE

BACKGROUND OF THE INVENTION

The present invention relates generally to an apparatus for inserting a flexible tubular liner into the interior of a conduit or pipe, such as a previously installed, underground sewer pipe and, more particularly, to such an apparatus which is self-contained and readily transportable.

It is generally well known that the conduits or pipes, particularly underground pipes, which are employed for conducting fluids, for example, sanitary sewer pipes, storm sewer pipes, water lines and gas lines, frequently require repair due to fluid leakage. The leakage may be inwardly, from the surrounding environment into the interior of the pipe, or outwardly, from the pipe into the surrounding environment. Leakage of this type may be due to improper initial installation of the pipe, deterioration of the pipe itself due to normal aging or the effects of conveying corrosive or abrasive materials, cracking of the pipe or pipe joints due to environmental conditions such as earthquakes, the movement of large vehicles or similar natural or man-made vibrations, or any other such causes. Regardless of the cause, such leakage is undesirable at best and may result in waste of the fluid being conveyed by the pipe, damage to the surrounding environment and the possible creation of dangerous public health hazards.

Because of ever increasing labor and machinery costs, it is becoming increasingly more difficult, at least economically, to dig up and replace underground pipes or portions or sections of such underground pipes which may be leaking. As a result, methods have been devised for the in situ repair or rehabilitation of the existing pipes, thereby avoiding the expenses and hazards associated with digging up and replacing the pipes or pipe sections. One of the more successful pipe repair or rehabilitation processes which is currently used is called the Insituform process and is described in U.S. Pat. Nos. 4,009,063; 4,064,211; and 4,135,958, the contents of which are incorporated herein by reference.

Briefly, in the Insituform process, an elongated flexible tubular liner comprised of a felt fabric or similar flexible material, which has been impregnated with a thermosetting synthetic catalyzed resin is installed within the existing pipe utilizing an inverting or everting process as described in the aforesaid patents. As the flexible liner is installed in the pipe, the liner is pressurized from within to force the liner radially outwardly to engage and conform to the interior surface of the pipe and to force some of the impregnated resin into any cracks or interstices within the walls of the pipe. The resin is then cured to form a relatively hard, tight fitting, rigid pipe lining which effectively seals cracks and repairs pipe or pipe joint deterioration to prevent further leakage either into or out of the pipe. The cured resin liner also serves to strengthen the pipe walls to provide added structural support for the surrounding overburden.

The method described in the aforementioned U. S. patents for inserting the liner into the pipe involves the use of a tower or scaffold which is approximately twenty-five to thirty feet high in order to provide the necessary water pressure head required to invert the liner and push it along the length of the pipe to be lined. While this method has been successfully utilized, it is relatively expensive in terms of both equipment and manpower to erect and operate such a large structure. In addition, such a large structure is awkward to utilize and, due to the height and the use of very hot water within the elevated structure to cure the resin, is dangerous to the operating personnel. Moreover, the existing liner insertion method is inadequate especially for the installation of a liner into a large diameter pipe since no positive control of the insertion and inversion of the liner is provided throughout the entire inversion process. In addition, it is difficult to work with the tremendous forces that are created by the water pressure required for such a large liner installation.

The present invention overcomes many of the difficulties inherent in the prior art liner installation method by providing a relatively self-contained mobile apparatus for the inversion of the liner and movement of the liner into the pipe. In this manner, the liner can be installed within the pipe without the need for a large tower and without the need for numerous operator personnel. The present invention also provides for effective, positive, continuous control of the rate of insertion of the liner as it is being installed within the pipe and, therefore, the present apparatus is adapted for use in connection with the installation of liners in pipes of differing diameters without the need for additional equipment or personnel. The present invention also provides a liner insertion apparatus which is relatively simple to erect and operate and which is readily transportable without the need for additional equipment.

SUMMARY OF THE INVENTION

Briefly stated, the present invention comprises a self-contained transportable apparatus for inserting a flexible tubular liner for having a leading end and a trailing end into a pipe. The apparatus comprises an insertion conduit with an entry end and an exit end. The insertion conduit is movable between a generally horizontally oriented transport position and a generally vertically oriented operating position in which the exit end is located proximate the pipe. Means are provided for sealing clampingly the leading end of the liner to the exit end of the insertion conduit and for creating a fluid type seal between the liner and the insertion conduit. Means, including a fluid source, are provided for maintaining a level of fluid within the insertion conduit sufficient to cause the liner to invert upon itself and to move into the pipe. A conveyor means, having an entry end and an exit end is also provided. The conveyor means includes a plurality of spaced idler rollers for conveying the liner to the entry end of the insertion conduit. The conveyor means is movable between a generally horizontally oriented transport position and a generally sloped operating position, in which the exit end of the conveyor means is higher than the entry end of the conveyor means and is located proximate the entry end of the insertion conduit. Feed control means are provided for controlling the rate of movement of the liner as the liner is inverted and moves into the pipe. Means are provided for moving the insertion conduit and the conveyor means between the transport position and the operating position. A frame means is provided for supporting the insertion conduit and the conveyor means, the frame means being adapted for movement from one location to another when the insertion conduit and the conveyor means are in the transport position.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings, embodiments which are presently preferred, it being understood, however, that the invention is not limited to the precise arrangements and instrumentalities shown. In the drawings:

FIG. 4 is an enlarged fragmentary view of a portion of the apparatus shown in FIG. 1;

FIG. 6 is a fragmentary plan view of the trailing end of the liner of FIG. 1 showing the connection means;

FIG. 7 is a fragmentary plan view of the trailing end of a larger liner showing the connection means;

DESCRIPTION OF PREFERRED EMBODIMENT

Figure 1:
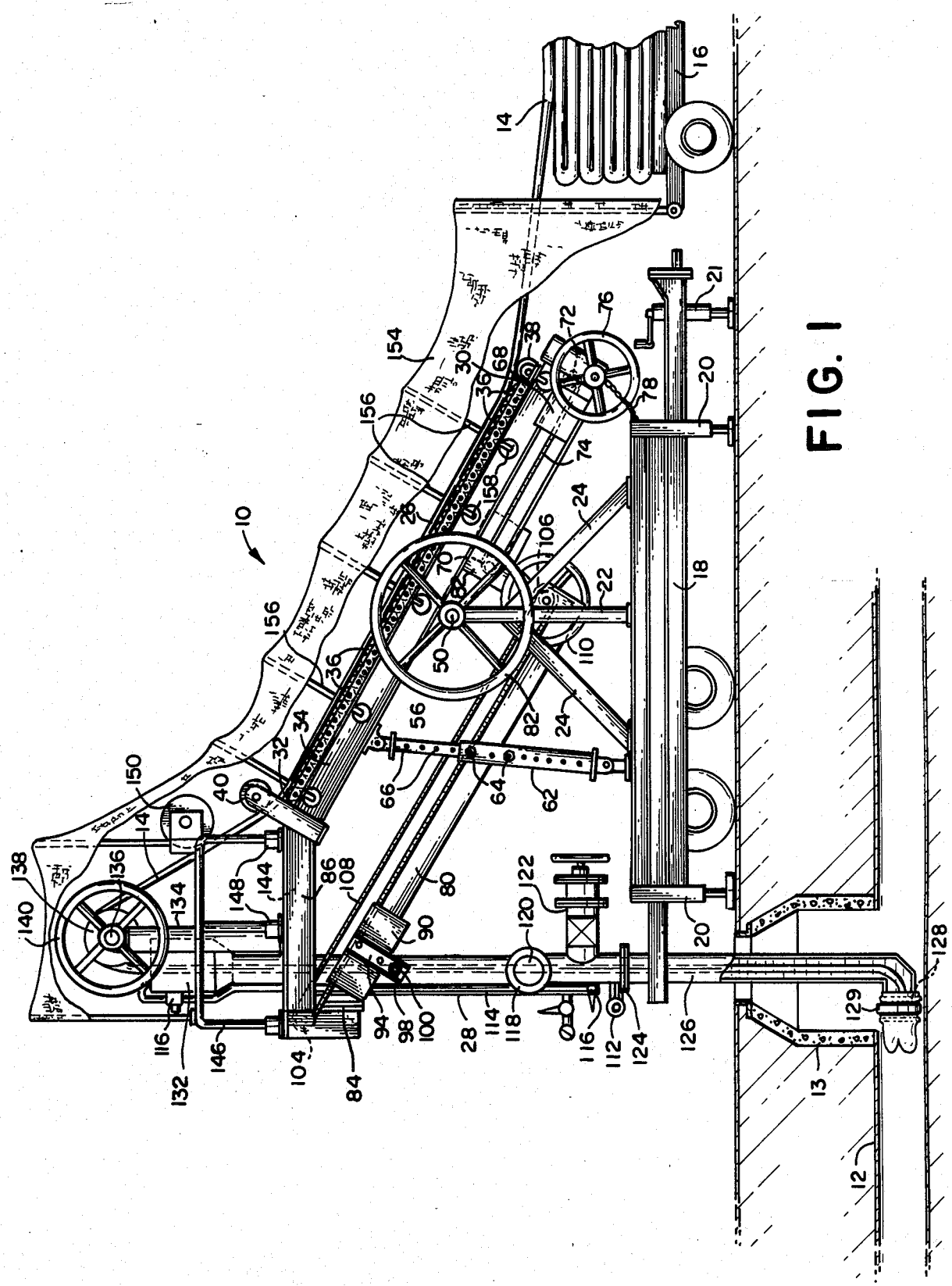
FIG. 1 is a side elevational view, partially broken away and partially in section of a transportable liner insertion apparatus in accordance with the present invention.

Referring to the drawings, wherein like numerals are employed for the indication of like elements throughout, there is shown in FIG. 1 an elevational view of an apparatus generally designated as 10 for inserting a flexible tubular liner within a conduit or pipe in accordance with the present invention. In the present embodiment, the conduit shown in FIG. 1 as 12 is an underground pipe or pipe line such as a sewer pipe. In the present embodiment, the sewer pipe 12 has a diameter of between about four and about twelve inches.

The liner 14, which is to be installed within the sewer pipe 12, is comprised of a predetermined length of elongated tubular material which has been impregnated with a thermosetting synthetic resin. Two types of flexible liners are presently available. The first type of liner (not shown in detail) has a polyester felt inner layer which is bonded to an outer layer of polyester felt and is coated with polyvinyl chloride. An epoxy resin is impregnated within the first type of liner. The second type of liner (also not shown in detail) has a polyester felt inner layer which is bonded to an outer layer of polyester felt and is coated with polyvinyl chloride. The second type of liner is impregnated with a resin system containing a polyester resin with a catalyst and initiator or a vinylester resin with a catalyst and initiator. The thickness of the layers of the liner may be varied, depending upon the particular application. Details of a method for impregnating the liner with the resin are available from the aforesaid patents and are not necessary for a complete understanding of the present invention. Likewise, various resin and catalyst systems can be used based on the varying environment, pipes, liner materials, etc. and are known to those skilled in the art. The outer diameter of the tubular liner 14 is generally equal to the inner diameter of the sewer pipe 12 to be lined.

The liner 14 is first selected for a particular application and is cut to a predetermined length, roughly corresponding to the length of the sewer pipe 12 to be lined. The predetermined length liner 14 is then impregnated with the selected thermosetting resin, preferably at a centralized liner preparation facility (not shown) and is lubricated and cooled to retard the curing of the thermosetting resin. The liner 14 is loaded onto a transport means by overlapping it and stacking it end to end. In the present embodiment, the transport means comprises a flatbed truck or trailer 16. The trailer 16 may include thermally insulated walls (not shown), or a special insulated container (not shown) in order to assist in keeping the liner 14 cool during transport from the centralized liner preparation facility to the remote location where the liner 14 is to be installed into the sewer pipe 12. Additional cooling means, such as pieces of ice or dry ice (not shown), may be inserted between the stacked liner layers, as well as on the sides, top and bottom of the stacked liner 14 to help keep the liner cool during transport.

The apparatus 10 also includes a transport means, in the present embodiment, a heavy duty flatbed trailer 18 of a type well known in the art and generally commercially available. The flatbed trailer 18 is employed for conveniently transporting the apparatus 10 from one location to another, in a manner which will hereinafter be described. The trailer 18 also serves to support the apparatus 10 when the apparatus is being employed for the insertion of a liner 14 into a sewer pipe 12, as shown in FIG. 1.

The trailer 18 includes leveling and support means, in the present embodiment, a plurality of mechanically or hydraulically operated support jacks 20, only two of which are shown in FIG. 1. The structure and operation of support jacks 20 of this type is generally well known and, therefore, will not be described in detail. Suffice it to say that when the trailer 18 is properly positioned and oriented at the job site of a liner installation, the jacks 20 are lowered in the usual manner, engaging the surrounding surface to provide firm support for the trailer 18, and to position and maintain the trailer 18 in a generally level condition. A parking jack 21 is also provided.

Figure 3:
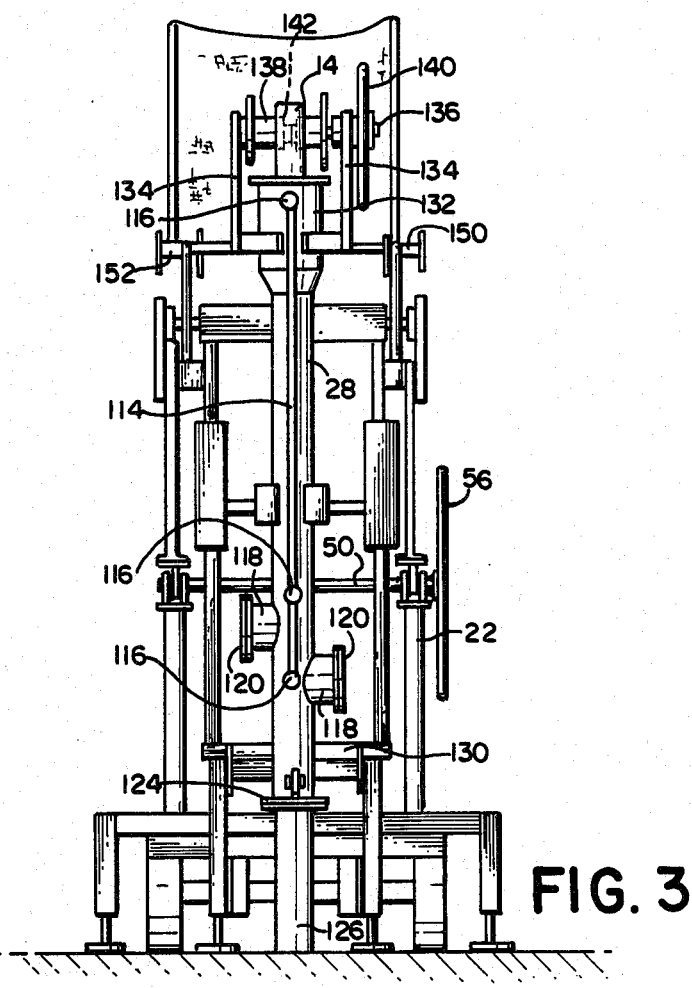
FIG. 3 is a rear elevational view of the apparatus of FIG. 1.

The apparatus 10 further includes a pair of primary support members 22 extending generally vertically upwardly from the trailer 18. As best seen in FIG. 3, one of the support members 22 is located on each side of the trailer 18, the support members 22 being generally laterally aligned with each other. The support members 22 are secured to the trailer 18 at their lower ends by any suitable means, such as welding, bolted flanges (not shown), or the like. Each of the support members 22 is stabilized by a pair of angled stabilizer members 24. The stabilizer members 24 are also secured at their lower ends to the trailer 18 in any suitable manner. The upper ends of the stabilizer members 24 are similarly secured to the support members 22 at approximately two-thirds of the way along their lengths. The support members 22 in cooperation with the stabilizer members 24 provide primary support for the remainder of the apparatus 10 in a manner as described in detail below.

The apparatus 10 includes conveyor means 26 and an insertion conduit 28. The conveyor means 26 has a liner entry end 30 proximate the forward end of the trailer 18 and a liner exit end 32 located proximate the insertion conduit 28. The conveyor means 26 is employed for moving or conveying the liner 14 from its flatbed trailer 16 to the insertion conduit 28 in a manner which will hereinafter be described in greater detail.

In the present embodiment, the conveyor means 26 is comprised of a pair of generally parallel, spaced, aligned, elongated frame members 34 which are maintained in their spaced relation by cross members (not shown) extending therebetween. Both the frame members 34 and the cross members (not shown) are made of steel or some other suitable high strength material. A plurality of generally parallel, spaced idler rollers 36 are rotatably supported by and extend between the two parallel frame members 34. The idler rollers 36 are spaced far enough from each other to permit each idler roller to independently rotate, but yet are spaced close enough to each other to provide generally continuous positive support for the liner 14 as it moves along the conveyor means 26. Control rollers 38 and 40 of a diameter greater than the diameter of the idler rollers 36 are similarly rotatably supported by the conveyor frame members 34 at the entry and exit ends, respectively, of the conveyor means 26.

Figure 2:
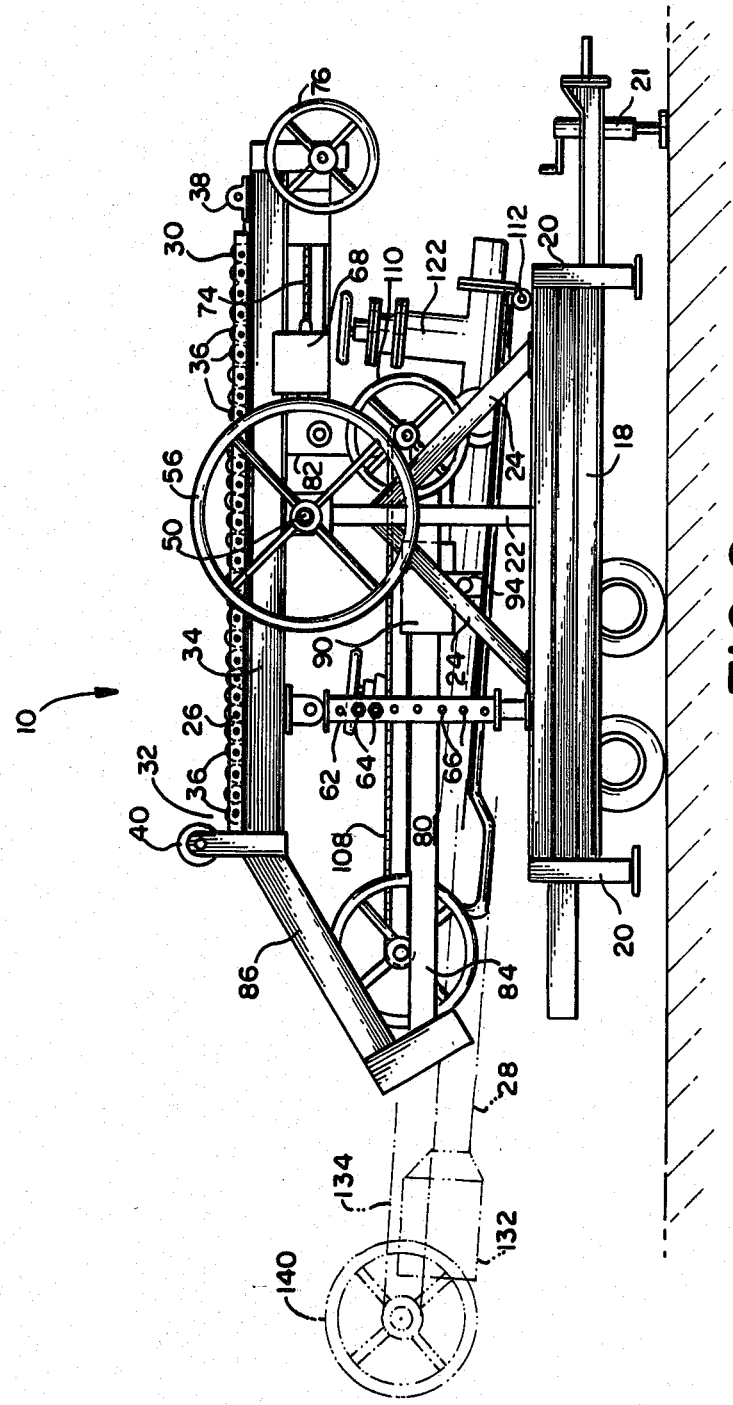
FIG. 2 is a side elevational view of a portion of the apparatus of FIG. 1 shown in the transport position.

FIG. 1 shows the conveyor means 26 in a generally sloped operating position in which the liner exit end 32 is at a height which is greater than the height of the liner entry end 30. In this position, the conveyor means 26 serves to facilitate the movement of the liner 14 from its initial level on the liner-transporting trailer 16 to the level required for entry into the insertion conduit 28. However, with the conveyor means 26 in the sloped operating position, as shown in FIG. 1, it would be difficult, if not impossible, to transport the apparatus 10 between liner installation locations since the height of the liner exit end 32 exceeds standard highway height restrictions. Thus, the conveyor means 26 is adapted for movement between the generally sloped operating position, as shown in FIG. 1, and a lower, generally horizontally oriented transport position, as shown in FIG. 2. In the transport position, the apparatus 10 has an overall height which is less than standardized maximum highway height restrictions, permitting the apparatus 10 to be transported from location to location.

To facilitate the movement of the conveyor means 26 between the transport position and the operating position, the conveyor means 26 is pivotally supported upon the top of the primary support members 22. As best seen in FIG. 4, (only one side shown) the upper end of each primary support member 22 includes a clevis-type connector member which includes two generally upwardly extending parallel spaced flange members 42. Each of the flanged column bracket members 42 includes a generally circular opening 44 extending therethrough, the openings 44 being in registry. Correspondingly, each of the conveyor means frame members 34 includes a single, generally downwardly extending flange member 46 which is of a thickness and suitably positioned to extend between the two flanged column bracket members 42 associated with the primary support member 22. The downwardly extending flange member 46 also includes a generally circular opening 48 extending therethrough, the size of the opening 48 being commensurate with the size of openings 44 extending through the support member flanges 42. A generally cylindrical shaft 50 extends through the openings 44 and 48 to pivotally secure the flanges 42 and 46 together. As best seen in FIG. 3, the shaft 50 extends completely across the apparatus 10 to pivotally connect each of the frame members 34 to the respective primary support members 22.

As shown in phantom in FIG. 4, each frame member flange opening 48 includes a generally radially outwardly extending ridge or key 52 which engages a complementary generally radially inwardly extending keyway or slot 54 (shown in phantom) in the shaft 50. In this manner, the shaft 50 is connected through the flanges 46 to the conveyor means frame members 34 for rotation upon the pivoting of the frame members 34. One end of the shaft 50 is similarly connected to a first generally circular control wheel 56 by means of a similar key and keyway arrangement shown in phantom as 58 and 60, respectively. In this manner, rotation of the control wheel 56 results in corresponding rotation of the shaft 50, causing a pivoting or tilting of the conveyor means 26. The conveyor means 26 can thereby be pivoted between the operating position as shown in FIG. 1, and the transport position as shown in FIG. 2.

The apparatus 10 further includes a pair of telescoping support members 62, only one of which is shown in FIG. 1, for supporting the raised exit end of the conveyor means 26. The lower end of each of the telescoping support members 62 is pivotally secured to the trailer 18, utilizing a clevis-type connection. Similarly, the upper end of each of the telescoping support members 62 is pivotally secured to the frame members 34, also utilizing a clevis-type connection. The length of the telescoping support member 62 is adjustable, depending upon the height of the conveyor means exit end 32. Thus, when the conveyor means 26 is in the operating position, as shown in FIG. 1, the telescoping support members 62 are extended to be longer than when the conveyor means 26 is in the transport position, as shown in FIG. 2. Means are provided for locking the telescoping support members 62 at a predetermined length. In the present embodiment, the means for locking the telescoping support members 62 comprises pairs of nuts and bolts 64, which extend through registered openings 66 in the telescoping portions of the telescoping support members 62. Utilizing the nuts and bolts 64, the telescoping support members 62 can be locked at the proper length to provide additional support for the conveyor means exit end 32, whether in the operating position or in the transport position.

A counterweight means is provided on the conveyor means 26 to assist in the pivotable movement of the conveyor means 26 between the transport position and the operating position. In the present embodiment, the counterweight means comprises a generally square counterweight 68 which is movably supported between the two frame members 34. The counterweight 68 is movable between a first, transport, position (shown in phantom in FIG. 1) close to midway along the length of the conveyor means 26, and a second, operating, position (shown in solid in FIG. 1) proximate the entry end 30 of the conveyor means 26. Means are provided for moving the counterweight 68 between the transport position and the operating position. In the present embodiment, the counterweight moving means comprises a first sprocket member 70 rotatably mounted proximate the middle of the frame members 34, and a second sprocket member 72 rotatably located proximate the liner entry end 30 of the conveyor means. A roller chain 74 extends around the two sprocket members 70, 72, as shown in FIG. 1. The ends of the chain 74 are secured to opposite ends of the counterweight 68. A second control wheel 76 is secured to one of the sprocket members, in the present embodiment, the second sprocket member 72, for rotation therewith. In this manner, rotation of the control wheel 76 results in corresponding rotation of the second sprocket member 72. The rotation of the second sprocket member 72 causes the chain 74 to move, correspondingly rotating the first sprocket member 70 to move the counterweight 68. The direction of movement of the counterweight 68 is determined by the direction of the rotation of the control wheel 76. Thus, when it is desired to move the conveyor means 26 from the transport position (FIG. 2) to the operating position (FIG. 1), the control wheel 76 should be rotated clockwise, thereby causing the chain 74 to rotate clockwise, moving the counterweight 68 toward the conveyor means liner entry end 30 (toward the right when viewing FIGS. 1 and 2). Movement of the counterweight 68 toward the right puts additional weight on the right or entry end of the conveyor means 26. Corresponding clockwise rotation of the first control wheel 56 results in the tilting of the conveyor means 26 to the position as shown in FIG. 1. Thereafter, the nuts and bolts 64 may be installed in the openings 66 in the telescoping support member 62 to lock the conveyor means 26 in place. A suitable flexible securing means, such as a cable or chain 78, may also be attached between the conveyor means liner entry end 30 and the corresponding forward end of the trailer 18 to help hold the conveyor means 26 in the operating position.

When it is desired to move the conveyor means 26 to the transport position, the chain 78 is removed, the nuts and bolts 64 are removed from the telescoping support members 62 and the first and second control wheels 56 and 76 are rotated in the counterclockwise direction. As the counterweight 68 moves toward the center of the conveyor means 26, the right end of the conveyor means is no longer weighted down and the conveyor means pivots in a counterclockwise direction until reaching a generally horizontal orientation, as shown in FIG. 2. The telescoping support members 62 may then be locked in place to help support the conveyor means 26 during transport.

The insertion conduit 28 is also pivotally supported about half way along its length to permit the insertion conduit to move between a generally vertically oriented operating position, as shown in FIG. 1, and a generally horizontally oriented position, as shown in FIG. 2. The insertion conduit 28 is supported by a pair of generally parallel L-shaped support members 80, only one of which is shown in FIG. 1. One end 82 of each of the L-shaped support members 80 is secured to the frame members 34 approximately midway along their length. The other end 84 of each of the L-shaped support members is secured to one end of a pair of flange members 86, the other end of which is secured to the liner exit end 32 of the conveyor means 26. In this manner, the frame members 34, L-shaped support members 80 and flange members 86 form a generally rigid frame means. Since the L-shaped support members 80 and the flange members 86 are secured to the frame members 34, they all move with the frame members 34 as the conveyor means 26 is pivoted between the transport position and the operating position.

Figure 5:
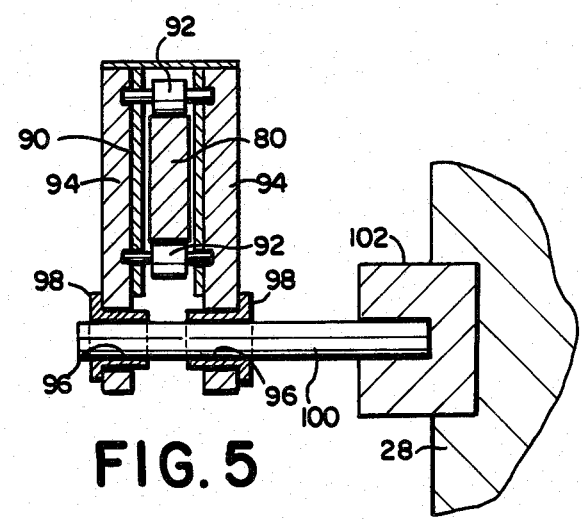
FIG. 5 is an enlarged fragmentary view, partially in section, of a portion of the apparatus of FIG. 1.

Referring now to FIG. 5, there is shown in greater detail the manner in which the insertion conduit 28 is pivotally supported by the L-shaped support member 80, only one-half of the support system being shown for the sake of clarity. A generally box-like support housing 90 generally surrounds the L-shaped support member 80 on three sides. The housing 90 is supported for movement along the L-shaped support member 80 by a pair of rollers or roller bearings 92, one roller bearing engaging the upper surface of the L-shaped support member and the other roller bearing engaging the lower surface of the L-shaped support member. Suitable bearing support means 94 are provided on the opposite sides of the housing for rotatably supporting the roller bearing 92.

The bearing support means 94 extend downwardly beyond the housing 90, as shown in FIGS. 1 and 5. Generally aligned circular openings 96 extend through the downwardly extending portion of the bearing support members 94. Suitable bushings 98 are installed within the openings 96. One end of a generally cylindrical shaft member 100 is supported within the bushings 98. The other end of the shaft member 100 is rotatably secured to the insertion conduit 28, utilizing a suitable connecting member 102.

The insertion conduit 28 is pivotally supported on both sides by shaft members 100 and, thus, is free to pivot clockwise or counterclockwise, when viewing FIG. 1. When the insertion conduit 28 is pivoted in a counterclockwise direction from the operating position (shown in FIG. 1) to a generally horizontal position (shown in phantom in FIG. 2), the insertion conduit extends outwardly (toward the left) beyond the rear or left end of the trailer 18. Means are provided for moving the insertion conduit inwardly (toward the right when viewing FIG. 2) to the position as shown in solid in FIG. 2. In the present embodiment, the means for moving the insertion conduit 28 comprises third and fourth rotatable sprocket members, 104 and 106, respectively, and a second roller chain 108. The ends of the chain 108 are secured to opposite ends of the insertion conduit supporting housing 90, as best seen in FIG. 1. One of the sprocket member, preferably the fourth sprocket member 106, is drivingly attached to a third control wheel 110. Rotation of the control wheel 110 rotates the sprocket member 106, causing the chain 108 to rotate about the sprocket member 104, moving the housing 90 along the L-shaped support member 80. Movement of the housing 90 along the L-shaped support member 80, in turn, moves the insertion conduit 28 between the extended position (shown in phantom in FIG. 2) to the withdrawn, transport position (shown in solid in FIG. 2). Of course, the direction of movement of the housing 90, as controlled by the rotation of control wheel 110, controls the direction of movement of the insertion conduit 28. The lower end of the insertion conduit 28 includes a roller or wheel 112 which is rotatably mounted thereon. The wheel 112 engages the upper surface of the trailer 18 to facilitate the movement of the insertion conduit 28 toward the left or right when viewing FIG. 2.

Referring again to FIGS. 1 and 3, a water pipe 114 is secured to and extends along one side (the left side when viewing FIG. 1) of the insertion conduit 28. The lower end of the water pipe 114 is adapted to be connected to a source of water (not shown). A plurality of valves 116 are located along the length of the water pipe 114 to control the flow of water through the water pipe 114. The upper end of the water pipe 114 is curved, as shown in FIG. 1, to direct the flow of water into the insertion conduit 28.

The lower end of the insertion conduit 28 includes means for interconnecting conduits or piping. In the present embodiment, the means comprises a pair of annular connection flange members 118 located on opposite sides of the insertion conduit 28. During the time when the liner 14 is being inserted into the sewer pipe 12, suitable cover plates 120 are sealingly secured to the connection flange members 118, as shown in FIGS. 1 and 3. Once the liner 14 is fully positioned within the sewer pipe 12, the cover plates 120 are removed and additional piping (not shown) is attached to the connection flange members 118. The additional piping includes a first, hot water pipe (not shown) and a second, return or suction, pipe (not shown). The hot water pipe and the suction pipe are employed for inserting hot water into and removing water from the insertion conduit during the curing of the liner.

Sealing means are also secured to the lower end of the insertion conduit 28 to maintain water pressure within the liner 14 between the time that the liner 14 is inserted in the sewer pipe 12 and the curing process is begun. In the present embodiment, the sealing means is shown generally as 122. A complete description of the structure and operation of the sealing means 122 is available in my co-pending U.S. patent application Ser. No. 645,123, filed Aug. 28, 1984, entitled "Method and Apparatus for the Installation of a Liner Within a Conduit," the disclosure of which is incorporated herein by reference.

The lower end of the insertion conduit includes an annular flange 124 to which is secured an elongated generally vertically extending flexible conduit or pipe 126 forming an extension of the insertion conduit 28. As shown in FIG. 1, the flexible pipe 126 extends into the manhole 13. The lower end of the flexible pipe 126 includes an elbow-like curved portion so that the exit end 128 of the flexible pipe 126 extends generally axially with the sewer pipe 12.

The insertion conduit exit end 128 includes means for sealingly clamping the leading end of the liner 14 to the insertion conduit 28 and for creating a fluid tight seal between the liner 14 and the insertion conduit 28. Complete details of the means for sealingly clamping the liner 14 into the insertion conduit are set forth in my aforesaid pending U.S. patent application.

As best seen in FIG. 3, auxiliary support beams 130 are employed for helping to support the insertion conduit 28 in the operating position. As also best seen in FIG. 3, the upper or entry end 132 of the insertion conduit 28 is greater in diameter than the remainder of the insertion conduit 28 to facilitate entry of the liner 14 into the insertion conduit. A pair of generally parallel, upwardly extending flange members 134 are secured at their lower ends to the insertion conduit 28 proximate its entry end 132. The flange members 134 rotatably support a generally cylindrical shaft member 136 which, in turn, supports a generally cylindrical liner control drum 138. The drum 138 is secured to the shaft member 136 by a key and slot or other suitable arrangement (not shown). A fourth control wheel 140 is secured to one end of the shaft member 136 for rotation therewith. In this manner, the fourth control wheel 140 may be employed for controlling the rotation of the drum 138. As best seen in phantom in FIG. 3, the liner control drum 138 includes a groove 142 extending around the entire outer surface at about its axial center, the groove 142 forming a capstan for purposes which will hereinafter become apparent.

The apparatus 10 also includes a generally flat, removable floor panel 144 which extends between and is supported by flange members 86. The floor panel 144 provides a place for an operator to stand when turning the fourth control wheel 140. The floor panel 144 may be removed from the apparatus 10 during transport.

The apparatus 10 further includes a removable safety fence 146 which extends around the floor panel 144 and is attached to suitable attachment means on the flange members 86. In the present embodiment, the safety fence comprises generally cylindrical pipe sections which are secured to the flange members 86 by generally cylindrical pipe socket or nipple members 148 which are secured to the flange members 86, for example, by welding. The safety fence 146 is installed when the apparatus 10 is in the operating position as shown in FIG. 1 and is removed when the apparatus 10 is in the transport position, as shown in FIG. 2.

Spool members 150 and 152 are rotatably secured to the removable safety fence 146, one on each side (see FIG. 3). Spool member 150 is employed for holding a length of rope (not shown) for controlling the feed rate of the liner 14 in a manner which will hereinafter be described. Spool member 152 is employed for holding a length of generally flat hose (not shown) which is utilized in the curing of the liner 14.

In the present embodiment, the apparatus 10 also includes a canopy 154 to cover or shade the liner 14 from the sun in order to keep the liner cool during the liner insertion process. The canopy 154 is supported by a plurality of generally tubular support members 156 which are removably secured by suitable brackets 158 extending along the sides of the frame members 34 and the removable fence 146. Of course, the canopy 154 is only installed when the apparatus 10 is in the operating position as shown in FIG. 1. The canopy 154 and its tubular support members 156 are removed when the apparatus 10 is in the transport position, as shown in FIG. 2.

FIG. 6 shows the connection means 160 that is used to connect a cable or rope (not shown) with the trailing end of the liner 162. A complete description of the structure of connecting means 160 is available in my co-pending U.S. patent application Ser. No. 645,123, filed Aug. 28, 1984, entitled "Method and Apparatus for the Installation of a Liner Within a Conduit," the disclosure of which is incorporated herein by reference. FIG. 7 shows a similar connection means 160' which is used to connect a rope or cable to the trailing end 162' of a larger sized liner 14'.

The foregoing discussion constitutes a description of the structure of the first embodiment of the present invention. In order to provide a better understanding of the interrelationship between the various components of the structure and the actual installation of a liner within a sewer pipe, a brief description of the operation of the apparatus will now be presented.

Prior to the installation of a liner 14, the sewer pipe 12 is thoroughly cleaned and inspected, preferably utilizing a TV inspection system (not shown). The precise diameter of the sewer pipe 12 is determined and the length of the pipe which is to be lined is also accurately measured. Based upon the diameter of the pipe to be lined, an appropriately sized liner is selected and the liner is trimmed to a length slightly greater than the length of the sewer pipe to be lined. The liner is then impregnated with the resin suitable for the particular environment utilizing an appropriate impregnation process, such as that described in one of the above-identified U.S. patents. As previously indicated, the liner preparation is preferably conducted at a central facility (not shown) under controlled conditions. The resin impregnated liner is lubricated, cooled and stacked on the liner trailer 16 for transport to the remote job site where the liner is to be installed.

Prior to the arrival of either the liner trailer 16 or the apparatus 10, the manhole 13 is ventilated and/or cooled and tested for safe gas condition. Sewage is then diverted from the sewer pipe 12 and the sewer pipe is cleaned for a final time.

When the apparatus 10 arrives at the job site, it is positioned as shown in FIG. 1 so that the rear of the trailer 18 is located proximate the manhole 13. The support jacks 20 are actuated to level and support the trailer 18. Control wheel 110 is rotated in a counterclockwise direction to move the housing 90 along the support member 80, thereby moving the insertion conduit 28 toward the rear of the trailer to a position as shown in phantom in FIG. 2. As previously discussed, the wheel 112 engages the upper surface of the trailer 18 to facilitate movement of the insertion conduit 28.

When the insertion conduit 28 is fully extended to the position as shown in FIG. 2, control wheel 76 is rotated in a clockwise direction, moving the counterweight 68 toward the front or forward end of the trailer 18 (toward the right when viewing FIG. 1). In this manner, the forward or liner entry end 30 of the conveyor means 26 is heavier than the rearward or liner exit end 32. Thus, when control wheel 56 is turned in the counterclockwise direction, the conveyor means 26 is pivoted to the sloped position, as shown in FIG. 1. The pivoting of the conveyor means 26 causes the telescoping support members 62 to extend. Thereafter, the nuts and bolts 64 are installed in the appropriate opening 66 to lock the telescoping support members 62 in position for supporting the conveyor means 26. Chain 78 is secured between the trailer 18 and the conveyor means entry end 30 as shown in FIG. 1.

Elevating the conveyor means 26 results in a corresponding elevation of the L-shaped support members 80 and the insertion conduit 28. The insertion conduit 28 is then pivoted to bring it to a generally vertical orientation, as shown in FIG. 1, and the auxiliary support members 130 are installed for supporting the lower end of the insertion conduit. Thereafter, the floor panel 144, removable safety fence 146, tubular canopy support members 156 and canopy 154 are installed in place, as shown in FIG. 1. A length of rope (not shown) longer than the length of the sewer pipe 12 to be lined is wound around the rope spool member 150. A corresponding length of flat hose is wound around the hose spool member 152. The flexible pipe 126 is secured to the lower end of the insertion conduit 28. A suitable fluid or water source (not shown) is attached to the lower end of the water pipe 114. The apparatus 10 is now ready for the installation of the liner 14.

When the liner trailer 16 arrives at the job site, it is positioned proximate the forward end of the apparatus as shown in FIG. 1. The forward or leading end of the liner 14 is pulled off of the trailer 16, up the conveyor means 26 on top of the idler rollers 36, under the upper control roller 40, over the liner control drum 138, and into the entry end 132 of the insertion conduit 28. As explained hereinafter, control roller 40 acts as a change-of-direction roller for the liner from a path along the conveyor means to an increased sloped path toward and over the control drum 138. Control wheel 140 is turned in a counterclockwise direction to pull the liner 14 up the conveyor means 26, thereby allowing the leading end of the liner to move down the insertion conduit until it extends out of the exit end 128. The leading end of the liner 14 is then turned inside out for the first six inches to form a cuff which is pulled back over the outside of the insertion conduit exit end 128, and is secured utilizing clamping means 129.

The water valves 116 are opened to allow water to flow through the water pipe 114 and to enter the top of the insertion conduit. Since the leading end of the liner 14 is secured to the insertion conduit exit end 128, the water will be contained within the insertion conduit and will fill the insertion conduit. As the water pressure within the insertion conduit builds up to a predetermined level, the water pressure causes the liner 14 to invert and move along the sewer pipe 12, as shown in FIG. 1. The water continues to flow into the insertion conduit 28 to maintain the water pressure at a level sufficient to move the liner along the sewer pipe 12. The rate of movement of the liner 14 is determined by the water pressure, the rotation of the liner control drum 138, and the weight of the liner moving up the conveyor means 26. It is important that the rate of movement of the liner into the sewer pipe 12 be strictly controlled to avoid any potential safety hazard, as well as to make sure that the liner is properly installed within the sewer pipe 12.

The control drum 138 and associated support structure in conjunction with control roller 40 comprise means for guiding the liner through a change of direction from the sloped path along the conveyer means 26 through an angle greater than 180° over the control drum 138 to the vertical path through the insertion conduit 28. By guiding the liner through a change of direction, more effective frictional contact between the liner and control drum 138 is maintained due to increased surface contact area so that the liner does not slip and manual control of the insertion of the liner is assured.

Installation of the liner into the sewer pipe continues in the above-described manner until the trailing end 162 of the liner reaches the conveyor means entry end 30. At this time, the liner installation is halted by stopping the rotation of the liner control drum 138. A cable or rope (not shown) is temporarily secured to the trailing end of the liner 162 by means of connection means 160 and the liner installation process is continued. The temporary cable or rope is used to help control the rate of the movement of the liner since, once the trailing end of the liner reaches the top of the conveyor means 26, the weight of the liner will no longer be a factor in inhibiting movement of the liner through the sewer pipe 12.

When the trailing end of the liner reaches the insertion conduit entry end 132, the operation is again stopped. At this point, a portion of the rope is unwound from the rope spool member and is looped several times around the capstan groove 142 in the liner control drum. The end of the rope is then secured to the trailing end 162 of the liner 14 by means of connection means 160. The end of the flat hose is similarly unwound from the hose spool member 152 and is secured to the trailing end of the liner by means of connection means 160. The liner insertion operation is then continued utilizing the rope (not shown) in conjunction with the capstan groove 142 and the control wheel 140 to control the feed rate of the liner into the sewer pipe 12. Of course, the trailing end of the liner 162 and the connection means 160 pull both the rope and the hose along with it to the distal end of the sewer pipe 12.

When the liner 14 has been completely inverted and inserted into the sewer pipe, the liner is cured in the same manner as discussed in detail in my aforementioned co-pending application. After the liner has completely cured, the apparatus 10 may be moved to its transport position by reversing the steps previously discussed in moving the apparatus 10 into the operating condition. More specifically, the canopy 154, tubular canopy support members 156, safety fence 146 and floor panel 144 are removed, as are the auxiliary support members 130 and the flexible pipe 126. To pivot the insertion conduit 28 in a counterclockwise direction, the nuts and bolts 64 are removed from the telescoping support member hole 66 and the chain 78 is removed from between the trailer 18 and the conveyor means 26. Control wheel 76 is turned in a counterclockwise direction to move the counterweight 68 towards the center of the conveyor means 26. Control wheel 56 is similarly turned in a counterclockwise direction to pivot the conveyor means 26 to a generally horizontal orientation, as shown in FIG. 2. Control wheel 110 is then turned in a counterclockwise direction to move the insertion conduit 28 inwardly (toward the right when viewing FIG. 2) to the position as shown in solid in FIG. 2. The support jacks 20 are withdrawn, nuts and bolts 64 are inserted into the telescoping support member hole 66, and the apparatus 10 is ready for movement to the next job site.

Figure 8:
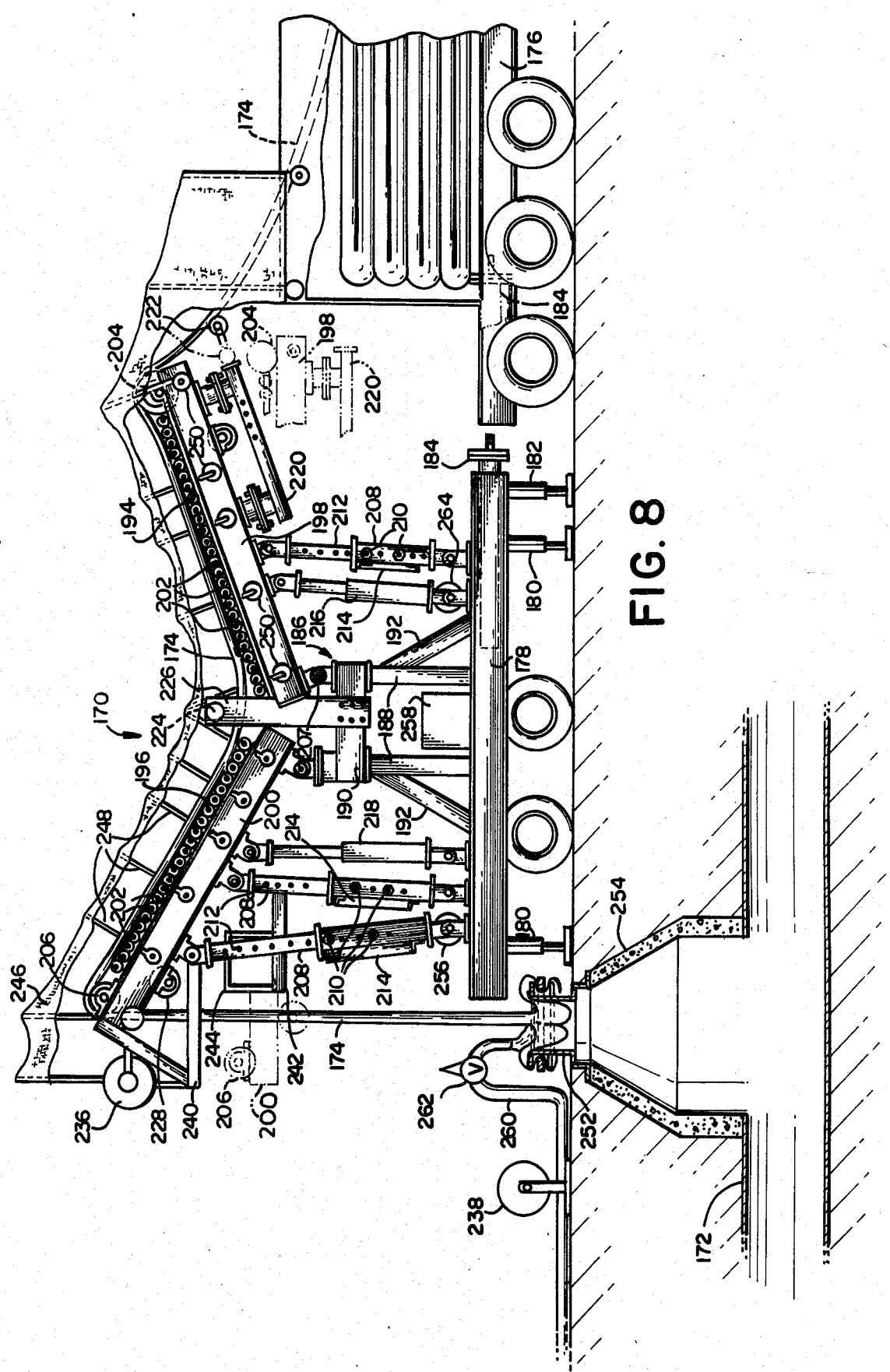
FIG. 8 is a side elevational view, partially broken away, of an alternate embodiment of the present invention.
Figure 10:
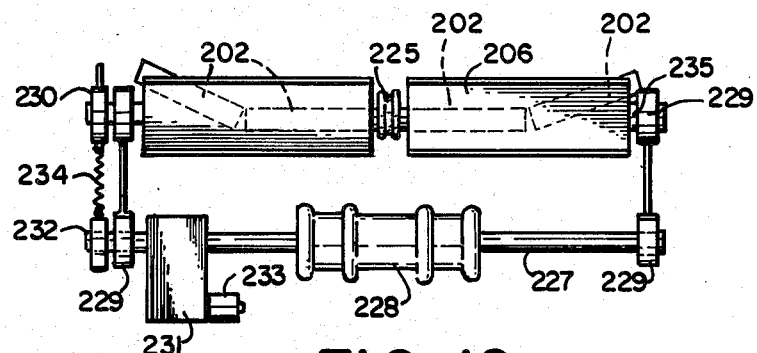
FIG. 10 is an enlarged fragmentary view of the portion of the apparatus shown in FIG. 9.
Figure 9:
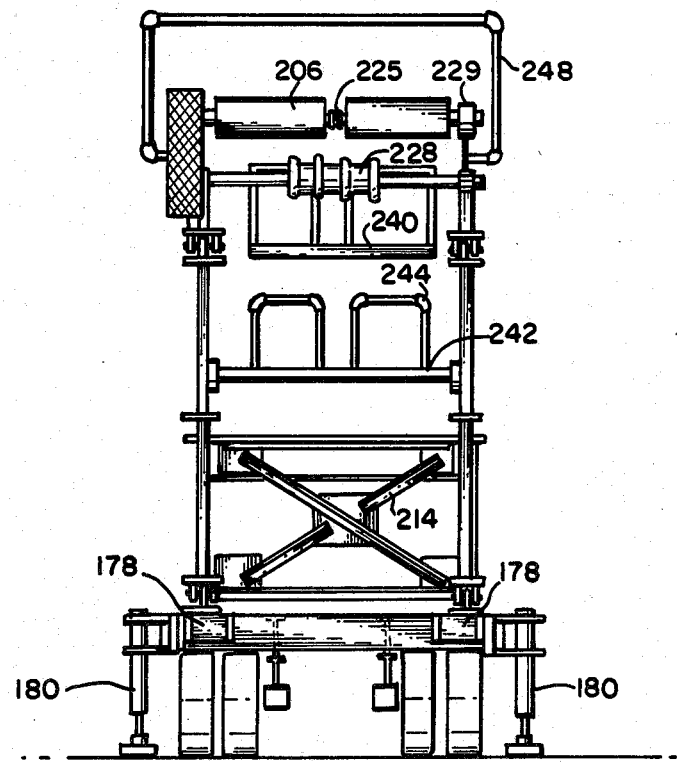
FIG. 9 is a rear elevational view of the apparatus shown in FIG. 8.

Referring now to FIGS. 8 through 10, there is shown a self-contained, transportable apparatus 170 for inserting a liner 174 into a pipe 172 in accordance with another embodiment of the present invention. The apparatus shown in FIGS. 8 through 10 is utilized primarily for the insertion of a liner 174 which is larger than the liner 14 which is inserted by the previously described apparatus 10. Preferably, the liner 174 has a diameter in the range of between 12 inches and 48 inches.

Because the liner 174 inserted by the apparatus 170 is larger in diameter, it is also heavier than the smaller sized liners, particularly after having been impregnated by the resin. Accordingly, apparatus 170 includes means for assisting the operator in lifting and moving the liner 174. Preferably, the means comprises hydraulically actuated rollers and other hydraulically actuated devices of the type described in detail below for lifting and moving the liner 174.

The structure of liner 174 is substantially the same as that of previously described liner 14, except that liner 174 is larger in size. Since the structure and preparation of the liner 174 is the same as that for liner 14, such details will not be repeated.

Similarly, the liner transport means of the present embodiment comprises a flatbed truck or trailer 176 which is substantially the same as trailer 16 of the above-described embodiment. Again, a detailed description of the trailer may be obtained above and will not be presented again.

The apparatus 170 also includes a transport means in the present embodiment, a heavy duty flatbed trailer 178, of a type well known in the art and generally commercially available. The trailer 178 includes levelling and support means, in the present embodiment, hydraulically operated levelling and support jacks 180, only two of which are shown in FIG. 8, and a parking jack 182 which is utilized to stabilize the front or forward end of the trailer 178. The levelling and support jacks 180 are employed in the usual known manner to engage the surrounding surface to provide firm support for the trailer and to position and maintain the trailer 178 in a generally level condition.

In the present embodiment, the trailer 178 includes a telescoping pull bar member 184. The telescoping pull bar member 184 may be extended outwardly (toward the right when viewing FIG. 8) from the trailer 178 as shown in phantom in FIG. 8 for movement of the trailer from one location to another. When the trailer 178 is in a fixed position, the telegraphing pull bar member 184 may be retracted, as shown in solid lines in FIG. 8, to allow for proper positioning of the liner trailer 176.

The apparatus 170 further includes a primary support frame shown generally as 186. The primary support frame 186, which may be made of steel or some other high strength material, comprises parallel generally vertically extending members 188 (only two of which are shown in FIG. 8), the lower ends of which are secured to the trailer 178 by suitable means, such as welding, bolt flanges, or the like (not shown). The upper ends of vertical members 188 are similarly secured to generally parallel horizontally extending support members 190 (only one of which is shown in FIG. 8. Each of the vertical support members 188 is stabilized by an angled stabilizer member 192 (only two of which are shown in FIG. 8). The vertical support members 188, horizontal support members 190 and stabilizer members 192 cooperate to provide a sturdy, stable, support frame 186 for providing primary support for the remainder of the apparatus 170 in a manner which will hereinafter become apparent.

The apparatus 170 includes conveyer means for conveying the liner 174 from the liner trailer 176 to the sewer pipe 172. In the present embodiment, the conveyer means is comprised of a first or liner unloading conveyer 194 and a second or liner inserting conveyer 196. Each conveyer 194 and 196 has a liner entry end (the right end when viewing FIG. 8) and a liner exit end (the left end when viewing FIG. 8). Similarly, each conveyer 194 and 196 is comprised of a pair of generally parallel, spaced, aligned elongated conveyer frame members 198 and 200, respectively (only one of each pair being shown in FIG. 8). The frame members 198 and 200 of each pair are maintained in their spaced relation by cross members (not shown) extending therebetween. The frame members 198 and 200 and the cross members (not shown) are made of steel or some other suitable high strength material.

A plurality of generally parallel spaced idler rollers 202 are rotatably supported by and extend between the pairs of frame member 198 and 200. The idler rollers 202 are spaced far enough from each other to permit each idler roller to independently rotate, but yet are spaced close enough to each other to provide generally continuous support for the liner 174 as it moves along the conveyers 194 and 196. A power roller 204 is rotatably supported between frame members 198 proximate the liner entry end of the liner unloading conveyer 194. A similar power roller 206 is rotatably supported between frame members 200 proximate the liner exit end of the liner insertion conveyer 196. The power rollers 204 and 206 are driven by suitable drive means, in the present embodiment, hydraulically powered drive means (not shown). The power rollers 204 and 206 are greater in diameter than the idler rollers 202. In addition, for reason which will hereinafter become apparent, the surfaces of the power rollers 204 and 206 are coated with a non-skid material to provide positive friction between the power rollers 204 and 206 and the liner 174. Power roller 206 has a guide sheave 225 located proximate the axial center. Guide sheave 225 is free to rotate on shaft 235.

The conveyer frame members 198 and 200 are pivotally supported on one end (left end of frame members 198 and right end of frame member 200 when viewing FIG. 8) upon the primary support frame 186. In the present embodiment, the conveyer frame members 198 and 200 are pivotally secured to the primary support frame 186, utilizing flange column bracket members 207 in substantially the same manner as described in detail above and shown in FIG. 4.

Telescoping support members 208 are employed for providing additional support for the conveyers 194 and 196. The telescoping support members 208 are substantially the same as telescoping support member 62 described in detail above. Each of the telescoping support members 208 is secured at its lower end to the trailer 178, utilizing a clevis-type connection. Similarly, the upper end of each of the telescoping support members 208 is pivotally secured to one of the conveyer frame members 198 and 200, also utilizing a clevis-type connection. The length of the telescoping support members 208 is adjustable, depending upon the height of the conveyers 194 and 196. Means, in the present embodiment nuts and bolts 210, which extend through register openings 212 in the telescoping portions of the telescoping support members 208 are provided for locking the telescoping support members 208 at a predetermined length. The telescoping support members 208 are arranged in generally aligned pairs, one member of each pair being on each lateral side of the trailer 178 (only one member of each pair being shown in FIG. 8). Sway braces 214, which may be removable, extend between the pairs of telescoping members 208 to provide additional lateral stability for the apparatus 170.

As with the previously described apparatus 10, conveyers 194 and 196 of the present apparatus 170 are movable between a transport position (shown in phantom in FIG. 8) in which the conveyers 94 and 96 are generally horizontally oriented and an operating position (shown in solid in FIG. 8) in which the conveyers 194 and 196 are in a generally sloped position. As previously discussed in detail, the purpose of having the conveyers 194 and 196 movable between the transport position and the operating position is to provide for sufficient height for properly inserting the liner 174 into the pipe 172, and yet provide a sufficiently low profile to permit the apparatus 170 to be moved from location to location along public highways.

Means are provided to facilitate movement of the conveyers 194 and 196 between the transport position and the operating position. In the present embodiment, the means comprises pairs of hydraulically actuated power cylinders 216 and 218, respectively (only one cylinder from each pair being shown in FIG. 8). The lower end of each of the hydraulically actuated power cylinders 216 and 218 is pivotally secured to the trailer 178 utilizing a clevis-type connection of the same general type employed in connection with the telescoping support members 208. Similarly, each of the hydraulically actuated power cylinders 216 and 218 is pivotally secured to the respective conveyer frame members 198 and 200. Actuation of the hydraulically actuated power cylinders 216 and 218 results in a pivotal movement of the conveyers 194 and 196. For example, the introduction of hydraulic fluid into hydraulically actuated power cylinders 216 causes the entry (rightward) end of conveyer 194 to move upwardly. Similarly, the removal of hydraulic fluid from power cylinders 216 causes the entry end of conveyer 194 to move downwardly. By utilizing the hydraulically actuated power cylinders 216 and 218, the use of counterweights 68, as employed in connection with the apparatus of FIGS. 1 through 7, may be avoided.

A telescoping guide roller assembly is secured to the undersurface of the liner entry end of conveyer 194. The telescoping guide roller assembly 220 includes a rotatably supported guide roller 222 on its distal end. The guide roller 222 is employed to assist in the movement of the liner 174 between the liner trailer 176 and the power roller 204. When the apparatus 170 is in the transport position, the guide roller 220 can be withdrawn to the position as shown in phantom in FIG. 8.

A change of direction roller 224 is rotatably supported between a pair of generally vertically extending flange members 226 secured to the horizontal support members 190 between the conveyers 194 and 196. The change of direction roller 224 is utilized to assist in the transition of the liner 174 between the liner unloading conveyer 194 and the liner insertion conveyer 196, and to insure that the liner does not become bent or crimped as its direction changes.

A triple capstan 228 is rotatably secured to the underside of conveyer member 196 proximate the liner exit end. The triple capstan 228 of the present embodiment is power driven, preferably utilizing hydraulic power. As best seen in FIG. 10 the triple capstan 228, sprocket member 232 and gear reduction assembly 231 are attached to shaft 227. Shaft 227 is supported by pillow block bearings 229 which are attached to conveyor frame member 200 by suitable means. Hydraulic motor 233 is attached to gear reduction assembly 231 and hydraulic hoses (not shown) provide power to hydraulic motor 233 and through gear reduction assembly 231 to rotate shaft 227. Power roller 206 is attached to shaft 235 and shaft 235 is supported by pillow block bearings 229 which are attached to conveyor frame member 200 by suitable means. Sprocket members 230 and 232 are connected to shafts 227 and 235 by means of a slot and a keyway (not shown) and are drivingly connected together by a suitable drive chain 234. Power to rotate power roll 204 is identical to the foregoing description, except that the second shaft does not support a triple capstan member. As also shown in FIG. 10, guide rollers 202 are tilted inwardly from the edges to help center the liner 174 and prevent the liner from falling off the edges of the conveyers 194 and 196.

As best shown in FIG. 8, a spool member 236 is removably, rotatably secured to the liner exit end of conveyer 196. Spool member 236 is employed for holding a length of cable or rope (not shown) for controlling the feed rate of the liner 174 in a manner which will hereinafter be described. A similar spool member 238 which is adapted for holding a length of generally flat hose (not shown) is positioned proximate the rear of the apparatus 170, as shown in FIG. 8.

Temporary scaffolding 240 and 242 is installed as shown to provide places for an operator to stand when operating the apparatus 170. The scaffolding 240 and 242 is removed when the apparatus 170 is in the transport position. The scaffolding 240 and 242 may include safety fence members 244 for the safety of the operator.

In the present embodiment, the apparatus 170 also includes a canopy 246 to cover or shade the liner 174 from the sun in order to keep the liner cool during the insertion process. The canopy 246 is removably supported by a plurality of generally tubular support members 248, which are removably secured by suitable brackets 250 extending along the sides of the conveyer frame members 198 and 200.

Inversion means, in the present embodiment an annular inversion ring 252 is placed at the entrance to the manhole 254 proximate the pipe 172. The leading end of the liner 174 is slipped over the inversion ring as shown. The inversion ring includes a pair of annular ribs and clamp means for clamping the leading end of the liner 174 firmly in place upon the inversion ring 252.

In operation, when the apparatus 170 arrives at the job site, it is positioned as shown, with the exit end of conveyer 196 proximate the manhole 254, as shown in FIG. 8. The support jacks 180 are hydraulically actuated to level and support the trailer 178 and the telescoping pull bar member 184 is withdrawn to the position as shown in FIG. 8. The apparatus 170 is connected to a suitable power source, for example, commercial power or an electric generator, for control purposes. A source of pressurized hydraulic fluid (not shown) is also connected to the apparatus 170. The flow of hydraulic fluid to the above-described hydraulically actuated components is controlled by the operator from a control panel 258.

The nuts and bolts 210 are removed from the telescoping support members 208 and the hydraulically actuated power cylinders 216 and 218 are actuated to tilt the conveyers 194 and 196 upwardly to the position shown in FIG. 8. Thereafter, the nuts and bolts 210 are reinserted into the registered openings 212 of the telescoping support members 208 to lock the conveyers 194 and 196 in position and to provide the required support.

The telescoping guide roller assembly 220 is similarly extended outwardly (toward the right in FIG. 8) so that guide roller 222 assumes the position as shown in solid in FIG. 8. The scaffolding 240 and 242 is installed and the tubular supports 248 and canopy 246 are installed as shown in FIG. 8. Similarly, the rope spool member 236 is installed in place on the liner exit end of conveyer 196.

When the liner trailer 176 arrives at the job site, it is positioned proximate the forward end of the apparatus 170 as shown in FIG. 8. One end of each of two temporary cables or ropes (not shown) is temporarily secured to the leading end of the liner 174. The other ends of the ropes are fed along power roller 204 under change-of-direction roller 224, around power roller 206, around a rope guide roller 256 located proximate the rearward most telescoping support members 208, and is thereafter looped around each part of the capstan 228. Hydraulic power is then supplied by the control panel 258 to hydraulic motor 233 which drives gear reduction assembly 231 to rotate shaft 227. Shaft 227 drives the capstan 228 and, through drive chain 234, power roller 206. A similar drive system provides power to drive power roller 204. Thereafter, the leading end of the liner 174 is pulled along the conveyers 194 and 196, and down to the insertion ring 252, where it is secured in the manner shown in FIG. 8. The temporary rope is then removed from the leading end of the liner 174. Water is supplied from a water source (not shown) along a water pipe 260 through valve 262, to the liner 174. The pressure created by the weight of the water causes the liner to invert and move downwardly into the manhole 254. Means (not shown) are provided for guiding the inverted liner 174 around the corner and to facilitate insertion of the liner 174 into the sewer pipe 172. The water is maintained at a predetermined level so that inversion and insertion of the liner 174 continues with the feed rate or rate of liner insertion being controlled by the rotation of power rollers 204 and 206, in combination with the weight of the liner 174.

Power rollers 204 and 206 and change-of-direction roller 224, in conjunction with the support structures for conveyors 194 and 196, comprise means for guiding the liner through a change of direction from the path leading from the trailer 176 through an angle greater than 180° over the roller 204 to a sloped path along conveyor 194, under change-of-direction roller 224, up an oppositely sloped path along conveyor 196, through another angle greater than 180° over power roller 206, and to a vertical path through the inversion ring 252. By guiding the liner through the change of direction, effective frictional contact between the liner and power rollers 204 and 206 is maintained due to increased surface contact areas with power rollers 204 and 206 so that the liner does not slip and positive control of the feed and insertion of the liner is assured.

When the trailing end of the liner 174 is removed from the liner trailer 176, the inversion operation is temporarily stopped. A temporary cable or rope (not shown) is wrapped three times around one of the outboard sections of the capstan 228 and is passed through the rope guide roller 256 and a second rope guide roller 264 located proximate the forward end of the trailer 178, and is attached to the trailing end of the liner, utilizing connection means 160', as shown in FIG. 7.

The inversion operation is restarted with the capstan 228 and rope controlling the feed rate of the liner 174, until the trailing end of the liner reaches the inversion ring 252. The liner insertion operation is again stopped and a length of cable or rope (not shown) is removed from spool member 236, is looped around the middle section of the capstan 228 and over guide sheave 225, and is secured to the trailing end of the liner 174. Similarly the free end of the flat hose (not shown) is removed from spool member 238 and is secured to the trailing end of the liner 174. The temporary cable or rope is removed and the insertion operation is continued, with the middle section of the capstan 228 and rope (not shown) controlling the liner insertion feed rate.

When the liner 174 has been completely inverted and inserted into the sewer pipe 172, the liner is cured in the same manner as discussed in my above-mentioned, co-pending application. After the liner has completely cured, the apparatus 170 is moved to its transport position by reversing the steps previously described. Thereafter, the apparatus 170 may be transported to another location for insertion of another liner.

From the foregoing description, it can be seen that the present invention provides a self-contained, transportable apparatus for inserting a flexible liner into the interior of a conduit or pipe. It will be recognized by those skilled in the art that changes could be made to the above-described embodiments of the invention without departing from the broad inventive concepts thereof. It is understood, therefore, that this invention is not limited to the particular embodiments disclosed, but it is intended to cover any modifications which are within the scope and spirit of the invention, as defined by the appended claims.

I claim:

1. A self-contained transportable apparatus for inserting a flexible tubular liner having a leading end and a trailing end into a pipe comprising:
  an insertion conduit having an entry end and an exit end, the insertion conduit being movable between a generally horizontally oriented transport position and a generally vertially oriented operating position in which the exit end is located proximate the pipe;
  means for sealingly clamping the leading end of the liner to the exit end of the insertion conduit and for creating a fluid tight seal between the liner and the insertion conduit;
  means, including a fluid source, for maintaining a level of fluid within the insertion conduit sufficient to cause the liner to invert upon itself and to move into the pipe;
  conveyor means having an entry end and an exit end for conveying the liner to the entry end of the insertion conduit, the conveyer means being movable between a generally horizontally oriented transport position and a generally sloped operating position in which the exit end of the conveyor means is higher than the entry end of the conveyor means and is located proximate the entry end of the insertion conduit;
  feed control means for controlling the rate of movement of the liner as the liner is inverted and moves into the pipe, including means for controlling the rate of movement of the trailing end of the liner;
  means for moving the insertion conduit and the conveyor means between the transport position and the operating position; and
  frame means for supporting the insertion conduit and the conveyor means, the frame means being transportable.

2. The apparatus as recited in claim 1 wherein the frame means includes a wheel-mounted trailer.

3. The apparatus as recited in claim 1 wherein the frame means includes a telescoping support member for supporting the exit end of the conveyor means, the support member being adjustable in length to compensate for the movement of the conveyor means between the transport position and the operating position.

4. The apparatus as recited in claim 3 further including means for locking the support member at a predetermined length.

5. The apparatus as recited in claim 1 wherein the conveyor means is pivotally secured to the frame means substantially midway along the length of the conveyor means.

6. The apparatus as recited in claim 5 wherein the conveyor means further includes counterweight means, the counterweight means being movable between a first, transport position substantially midway along the length of the conveyor means and a second, operating position proximate the entry end of the conveyor means.

7. The apparatus as recited in claim 6 further including means for moving the counterweight means between the first position and the second position.

8. The apparatus as recited in claim 7 wherein the means for moving the counterweight means comprises first and second sprockets having a chain extending therebetween, the ends of the chain being secured to the counterweight means and means for rotating at least one of the sprockets for movement of the chain and counterweight means between the two sprockets.

9. The apparatus as recited in claim 8 wherein the means for moving the counterweight means further includes a handwheel attached to one of the sprockets for movement thereof.

10. The apparatus as recited in claim 9 further including means for securing the entry end of the conveyor means to the frame means when the conveyor means is in the operating position.

11. The apparatus as recited in claim 10 wherein the means for securing the entry end of the conveyor means to the frame means comprises a chain.

12. The apparatus as recited in claim 1 wherein the insertion conduit is pivotally supported by the frame means substantially half way along the length of the insertion conduit, whereby the insertion conduit may be pivoted between the generally vertical operating position and a generally horizontal position.

13. The apparatus as recited in claim 12 wherein the means for pivotally supporting the insertion conduit is movable between a first, transport position proximate the midpoint of the conveyor means and a second, operating position opposite the exit end of the conveyor means.

14. The apparatus as recited in claim 1 further including means for guiding the liner through a change of direction to assure frictional contact between the liner and the feed control means as the liner is inverted and moves into the pipe.

15. A self-contained transportable apparatus for inserting a flexible tubular liner having a leading end and a trailing end into a pipe comprising:
  inversion means for sealingly clamping the leading end of the liner with a fluid-type seal, the inversion means being positioned proximate the pipe;
  means, including a fluid source, for maintaining a level of fluid sufficient to cause the liner to invert upon itself and to move into the pipe;
  conveyor means having an entry end, and an exit end aligned with the inversion means, the conveyor means further including a plurality of spaced idler rollers and at least one hydraulically driven power roller, the conveyor means being adapted for conveying the liner to the inversion means, the conveyor means being movable between a generally horizontally oriented transport position and an operating position in which the conveyor means is generally sloped with both the entry end and the exit end being higher than the remainder of the conveyor means;
  feed control means for controlling the rate of movement of the liner into the pipe, including means for controlling the rate of movement of the trailing end of the liner;
  means for moving the conveyor means between the transport position and the operating position; and
  frame means for supporting the conveyor means, the frame means being adapted for movement from one location to another.

16. The apparatus as recited in claim 15 wherein the frame means includes a wheel-mounted trailer.

17. The apparatus as recited in claim 15 wherein the frame means includes at least one telescoping support member for supporting the entry end of the conveyer means and at least one telescoping support member for supporting the exit end of the conveyer means, the telescoping support members being adjustable in length to compensate for the movement of the ends of the conveyer means between the transport position and the operating position.

18. The apparatus as recited in claim 17 further including means for locking the telescoping support members at predetermined lengths.

19. The apparatus as recited in claim 15 wherein the means for moving the conveyer means between the transport positions and the operation position includes at least one hydraulically actuated power cylinder for moving the entry end of the conveyer means and at least one hydraulically actuated power cylinder for moving the exit end of the conveyer means.

20. The apparatus as recited in claim 15 wherein the conveyer means comprises first and second conveyers aligned in end-to-end relation, the adjacent conveyer ends being pivotally secured to the frame means.

21. The apparatus as recited in claim 15 wherein the inversion means comprises a generally annular inversion ring.

22. The apparatus as recited in claim 15 wherein the feed control means comprises a hydraulically actuated capstan rotatably secured to the conveyer means.

23. The apparatus as recited in claim 15 further including means for guiding the liner through a change of direction to assure frictional contact between the liner and the power roller.

* * * * *